United States Patent [19] [11] 3,712,110
Paulik et al. [45] Jan. 23, 1973

[54] SAMPLE HOLDER FOR SELECTIVE THERMOANALYTICAL TESTS

[75] Inventors: Jeno Paulik; Ferenc Paulik, both of Budapest, Hungary

[73] Assignee: Magyar Optikai Muvek, Budapest, Hungary

[22] Filed: Feb. 22, 1972

[21] Appl. No.: 228,117

[30] Foreign Application Priority Data

Feb. 22, 1972 Hungary ............................ MA-2196

[52] U.S. Cl. ................................................ 73/15 B
[51] Int. Cl. ............................................. G01n 25/00
[58] Field of Search ..................... 73/15, 23, 23.1, 190

[56] References Cited

UNITED STATES PATENTS 3,545,253  12/1970  Iwata et al. ............................... 73/15

Primary Examiner—Richard C. Queisser
Assistant Examiner—Herbert Goldstein
Attorney—Irvin S. Thompson et al.

[57] ABSTRACT

A sample holder for selective thermoanalytical analysis of specimens, comprises a receptacle for the specimen and cover means for the receptacle. The cover means provides a labyrinthine path for escape of gases from the sample. This labyrinthine path can be provided by concentric cylindrical elements which permit the gas to escape past alternately opposite edges thereof, or a helical groove in the outer cylindrical periphery of the cover means that defines the labyrinthine path. A thermocouple for continuously detecting the temperature of the sample is disposed in a central recess in the bottom of the vessel.

9 Claims, 3 Drawing Figures

SAMPLE HOLDER FOR SELECTIVE THERMOANALYTICAL TESTS

The invention relates to a sample holder for selective thermoanalytical tests.

The detection of the overlapping thermal transformations is one of the tasks to be performed by thermoanalysis. For carrying out this task, various sample holders are known, increasing considerably the selectivity of the thermoanalytical tests. The selectivity-increasing effect of the sample holder is based, in these known devices, on the principle that the material to be tested can be spread in a thin layer over the large surface of the sample holder consisting of several small dishes. When the material is spread in a thin layer, the gaseous decomposition products which are released cannot be trapped in the air space between the grains and consequently cannot shift the thermal decomposition reaction toward the higher temperatures, which was the case with the older sample holders. From the grains spread in a thin layer, most of the gaseous decomposition products immediately leave so that the transformations take place at lower temperatures, over smaller temperature intervals. In this known sample holder, the reactions follow and more or less overlap each other and so take place separately, due to the smaller temperature interval. The drawback of this sample holder is, however, that with the majority of the materials there is no increase in the selectivity of the test; on the contrary, the course of the successive transformations becomes even more confused. This phenomenon can be traced back to known physical-chemical phenomena necessarily present with some groups of these materials.

The present invention aims at the elimination of the enumerated drawbacks and the development of a sample holder by means of which the decompositions during the thermoanalytical tests can be carried out at well-defined temperatures.

Thus, the invention comprises a sample holder for selective thermoanalytical tests, having a space accommodating the sample and a cover closing the space.

According to the invention, to the mouth opening or mouth openings of the vessel forming the space containing the sample a cover or covers are connected in such a manner that between the mouth opening and the cover a gas offtake channel or a channel labyrinth is arranged.

The cover can form a single unit with the space dividing elements, and in this case in the space limited by the space dividing elements further space dividing elements are arranged.

Finally, the gas offtake channel labyrinth is provided with gas outlet valve.

In the case of a sample holder according to the invention, in the inside of the space containing the sample an atmosphere of 100 percent purity of the gaseous decomposition products is obtained. The continuous flow of the gaseous decomposition products released from the inside of the sample arranged in the space entrains just at the beginning of the thermal decomposition the air or the molecules of the gas in which the test is just carried out from the space not filled by the grains of the material as well as from the space above the sample. These air and gas molecules cannot return from the environment into the testing space of the sample holder since this is prevented by the long gas offtake channel labyrinth provided with several directional changes. In this way, no air enters the space containing the sample against the flow of the discharging gaseous decomposition products.

The thermal decomposition of the material of total purity, being in contact with the gaseous decomposition products, starts at a well-defined decomposition temperature corresponding to a decomposition pressure of 760 torr and is completed at the same temperature without a further increase of the temperature. Thus, the decomposition does not take place in a wide interval of temperature which sometimes is of several hundreds of degrees C., as with the conventional sample holders but practically at a single well-defined temperature which is as much characteristic to the material as the temperature of the melting point or boiling point.

The sample holder according to the invention will be described in more detail in connection with several embodiments shown by way of example in the accompanying drawings, in which.

Figure 1:
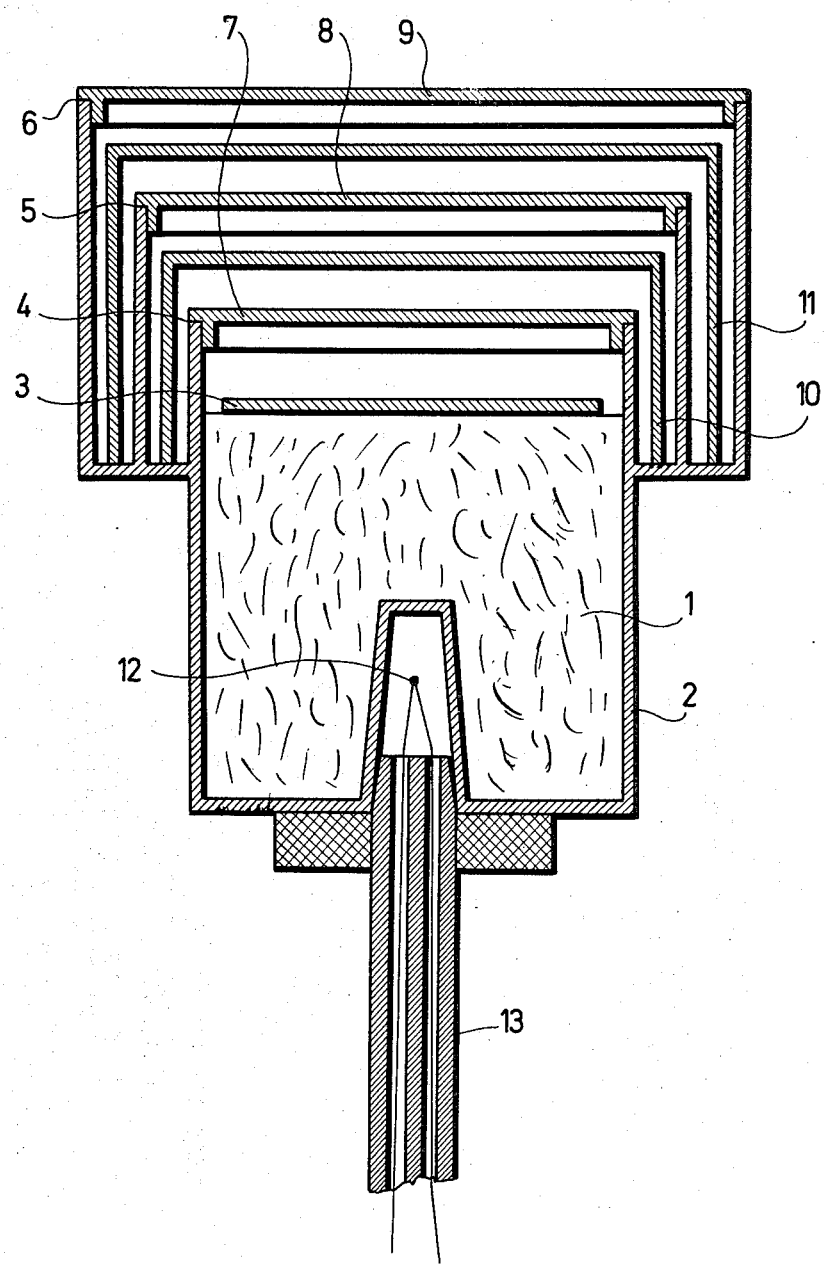
FIG. 1 shows a vertical longitudinal section of a first embodiment of the sample holder according to the invention.

Referring now to the drawings in greater detail, and first to FIG. 1, the powdery sample 1 is arranged in a vessel 2 preferably made of platinum. In order to reduce the free surface of the powdery sample 1 a platinum plate 3 is laid over the sample 1. The mouth opening of the vessel 2 is provided with three bearing rings 4, 5, and 6 of different heights. On the bearing ring 3 the cover 7, on the bearing ring 5 the cover 8 and on the bearing ring 6 the cover 9 are placed. In order to force the gaseous decomposition products to flow along a path as long as possible, space dividing elements 10 and 11 are arranged between the covers 7, 8, and 9 closing the covers 7 and 8, respectively, as a cap. Since the said space dividing elements 10 and 11 are located quite simply without packing, the gaseous decomposition product can seep past their supporting edges and between the upper edges of the rings 4, 5 and 6 and their respective covers 7, 8, and 9. In the above described manner, the path of the gas is essentially labyrinthine. The temperature occurring during the decomposition is measured by means of a thermocouple 12 having its electrical connections extending through spaced parallel bores in tube 13.

As a consequence of the labyrinthine escape route of the decomposition gases, the gas molecules of the environment cannot enter the testing space of the vessel 2.

Figure 2:
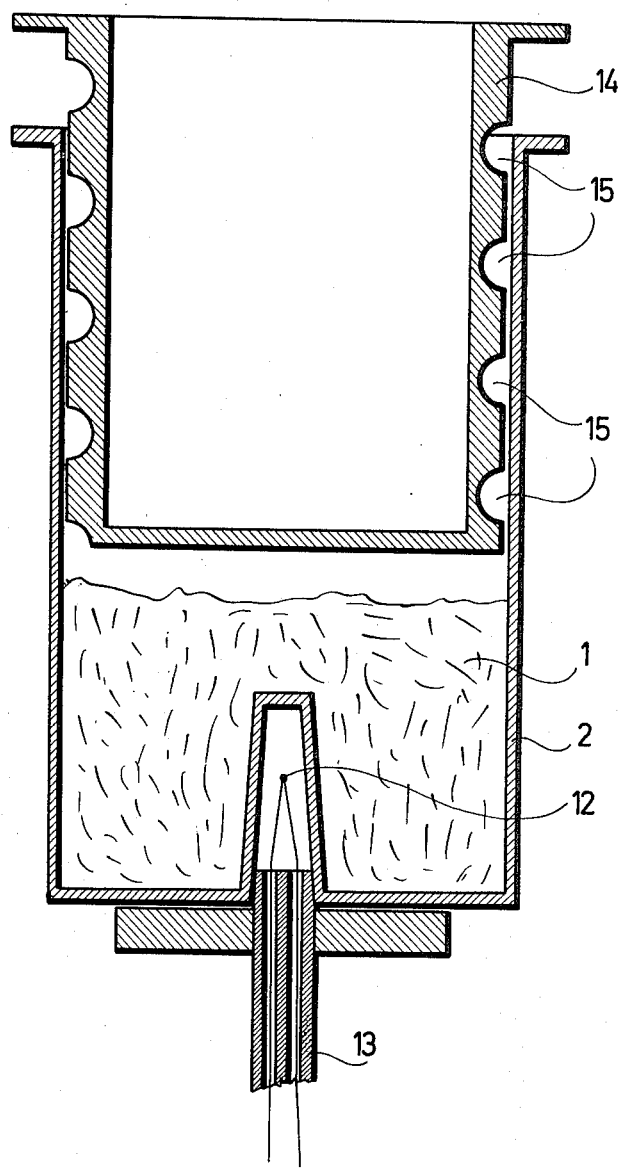
FIG. 2 is a vertical longitudinal section of another embodiment where the cover is one piece.

In the alternative embodiment shown in FIG. 2 the sample 1 is similarly arranged in a vessel 2. The closely fitting cover 14 in the inside of the vessel 2 is essentially a cylinder to be pressed like a piston into the vessel 2. On the cylindrical peripheral surface of the cover 14 a helical groove 15 is developed which, together with the inner side wall of the vessel 2 forms the labyrinthine channel for the exit gases.

Figure 3:
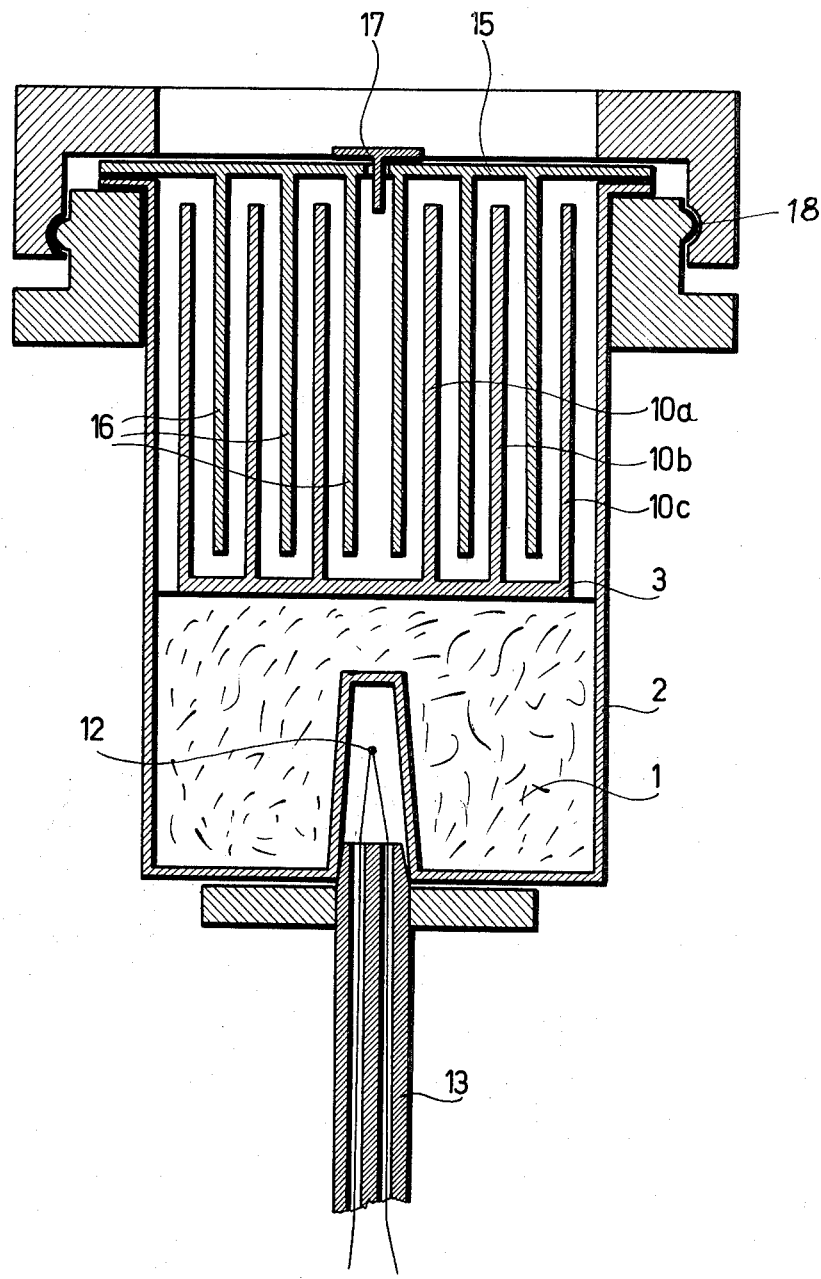
FIG. 3 is a vertical longitudinal section of a third embodiment.

In the embodiment, shown in FIG. 3, the sample 1 arranged in the vessel 2 is covered by a plate 3 as in FIG.

1. The space dividing elements 10a, 10b and 10c, respectively, are concentrically arranged on the plate 3 and are integral therewith. In this embodiment, the cover 15 is similarly provided with space limiting elements 16 forming concentric cylinders integral therewith. The cover 15 is developed so that elements 16 protrude between the space dividing elements 10a, 10b, and 10c. In the center of the cover 15 a valve 17 is arranged which opens under the influence of the gas pressure that builds up under cover 15. The cover 15 is clamped on vessel 2 in a known manner, e.g., by means of a bayonet lock 18.

The gaseous decomposition products released during the test flow in a labyrinthine path and finally escape through the valve 17 into the open air, preventing thus the gas molecules of the environment from penetrating into the testing space.

The invention is not limited to the embodiments shown by way of example; within the scope of the appended claims it can be executed in any of a variety of other forms.

What we claim is:

1. A sample holder for selective thermoanalytical tests, comprising a vessel for holding a sample to be tested, cover means closing said container, said cover means defining a labyrinthine path for the escape of gases from said vessel, and means carried by said vessel for detecting the temperature of said sample.

2. A sample holder as claimed in claim 1, said cover means comprising a plurality of concentric rings of different heights, and a cover resting atop each said ring.

3. A sample holder as claimed in claim 2, and inverted cups between said rings, the gases following said labyrinthine path passing between said rings and their covers, and under the edges of said inverted cups.

4. A sample holder as claimed in claim 1, said cover means comprising a single cover member that defines between itself and said vessel said labyrinthine path.

5. A sample holder as claimed in claim 4, said single cover having a cylindrical outer periphery disposed within and closely adjacent a cylindrical inner periphery of said vessel, said cylindrical outer periphery having a helical groove therein defining said labyrinthine path.

6. A sample holder as claimed in claim 1, said cover means comprising a plate disposed within said vessel above a sample therein and a cover closing the vessel and having portions interfitting with portions of said plate to define said labyrinthine path.

7. A sample holder as claimed in claim 6, said plate having upstanding concentric cylinders thereon and said cover having downwardly depending concentric cylinders that fit between the concentric cylinders of said plate thereby to define said labyrinthine path.

8. A sample holder as claimed in claim 7, said plate resting on said sample and exposing said sample outwardly of said plate, said cover having a central opening therethrough for escape of gases at the end of said labyrinthine path.

9. A sample holder as claimed in claim 1, said vessel having a recess therein for said temperature detecting means.

* * * * *